Patented Sept. 15, 1925.

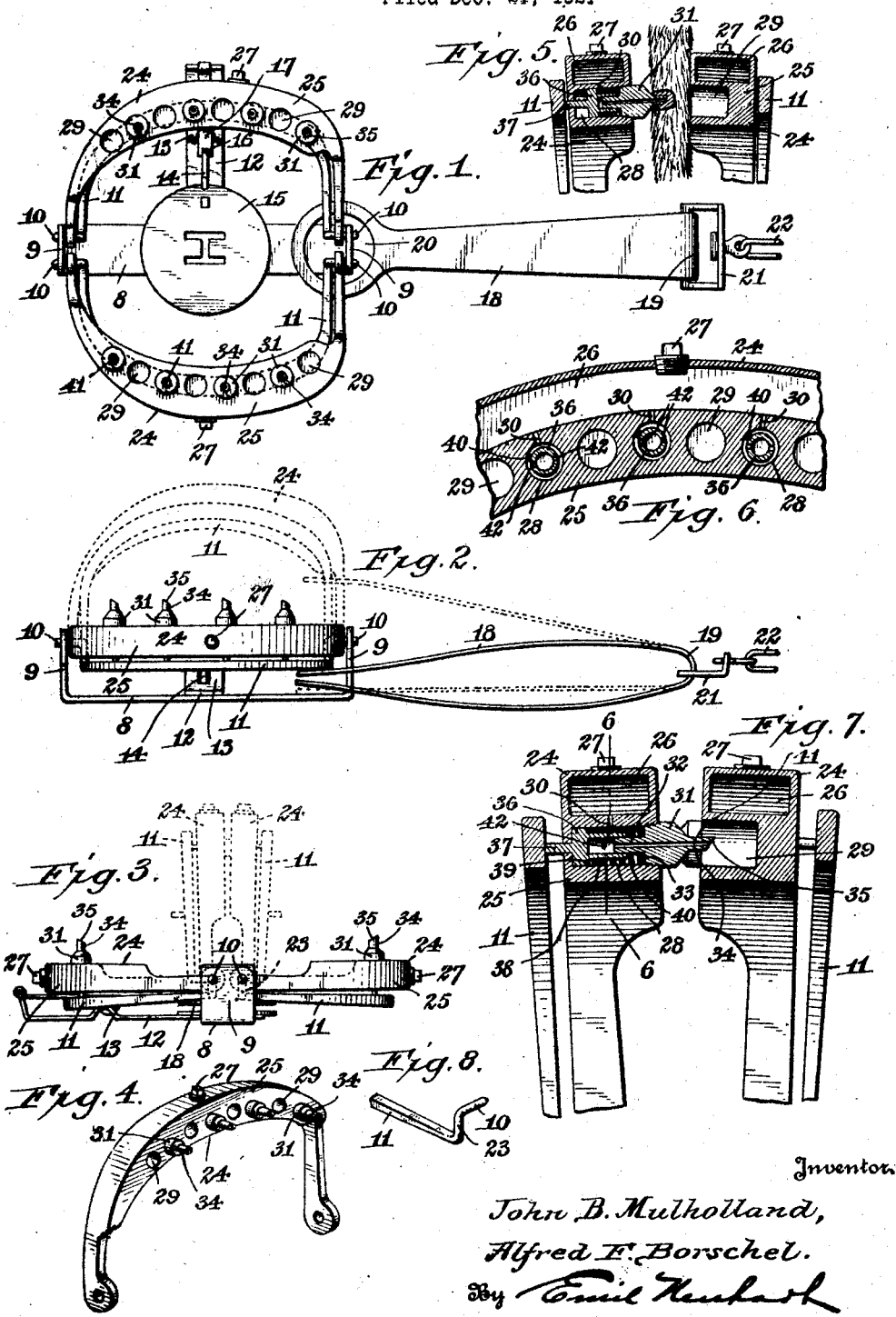

1,553,389

UNITED STATES PATENT OFFICE.

JOHN B. MULHOLLAND AND ALFRED F. BORSCHEL, OF BUFFALO, NEW YORK.

ANIMAL TRAP.

Application filed December 21, 1921. Serial No. 523,858.

*To all whom it may concern:*

Be it known that we, JOHN B. MULHOLLAND and ALFRED F. BORSCHEL, citizens of the United States, residing at Buffalo, in the county of Erie and State of New York, have invented certain new and useful Improvements in Animal Traps, of which the following is a specification.

Our invention relates to animal traps, and more particularly to what are generally referred to as steel jump traps.

It is universally acknowledged that the present form of jump trap is inhumane. In fact, reform in the present frightful abuses connected with trapping is highly desirable and demanded. The extensive trapping under present methods results in millions of small animals being caught each year by steel traps, for the sake of their furs, and the animals so caught, frequently remain ensnared in these traps for days without food or water, as the traps do not instantly kill them. Large numbers therefore die of cold and starvation, as well as the assaults of their animal enemies that eat them alive. Many of the animals so trapped have bitten their legs off and gone free, but in doing so; they have not avoided suffering, agony, and terror.

The great objection to the present form of trapping lies in the fact that the animals ensnared linger for many days suffering torture, until killed by the trapper. The present system of cruel trapping is the most efficient for the purpose intended, but as universally practiced, is a brutalizing business, particularly for the reason that the professional trapper will cover a territory of many miles, taking hundreds of traps with him and setting them at intervals in places that to him appear desirable. For this reason, animals caught in the first traps set on the trip, will suffer for hours and sometimes days before the trapper again reaches the point to ascertain whether or not the trap has been snapped and an animal caught therein; the delay in ascertaining this, resulting from the fact that the trapper covers a considerable territory extending sometimes from ten to forty or fifty miles, is two-fold; namely, to trap as many animals as possible within a given time, and also to avoid the smell of man about the traps, which would exist if a single or only a few traps were set and constant guard and attention given the traps.

With a view of obviating the above objections, the primary object of our invention is the production of a humane trap which will assure almost instant death to the animal trapped.

A further object is to provide a trap with means to penetrate the leg or foot of an animal and inject a poisonous fluid into the animal so as to cause instant or almost instant death.

A further object of our invention is to apply a fluid-injecting device to the present type of steel trap, the device being arranged, in preferred form, in two co-acting parts which are snapped upwardly with the jaws of the trap, one or both parts having fluid ejecting teeth or prongs adapted to be forced into the foot or leg of the animal coming in contact with the detent plate of the trap.

With the above and other objects in view, our invention consists in providing a humane trap whereby the torturing of animals is obviated and whereby the trapped animal is killed almost instantly.

A further object consists in applying fluid-injecting means to a steel trap, for the purpose of injecting a poisonous fluid into the animal trapped.

It further consists in equipping a steel trap with co-acting elements adapted to be snapped into ensnaring position by the jaws of the trap.

It still further consists in the novel features of construction and in the arrangement and combination of parts to be hereinafter described and more particularly pointed out in the subjoined claims.

It may here be stated from a scientific point of view, that a poisonous fluid that will instantly or almost instantly cause death to small fur-bearing animals may be such that if a person should accidentally step upon the step plate of the trap and a quantity of the fluid be injected into such person, the effect, although hurtful, will not be dangerous. It is the intention that each trap have information attached thereto in reference to the treatment to be applied in such cases; or, suitable warning signs may be placed at suitable points around the trap to inform others in reference to the location of the trap; or signals of a particular type, without reading matter, may be placed at different points around the trap, the meaning of which signals will become generally known. While such precautions may be taken, it is not considered necessary, as science has provided fluids poisonous to animals which will not be injurious to a human being.

In the drawings:—

Fig. 1 is a plan view of our improved trap, showing the same in opened position.

Fig. 2 is a side elevation of the same.

Fig. 3 is an end view of the same.

Fig. 4 is a detached perspective view of one of the pivoted fluid containers or puncturing elements.

Fig. 5 is a transverse section taken through the trapping jaws and the fluid containers, showing the same in ensnaring position.

Fig. 6 is a section taken on line 6—6, Fig. 7.

Fig. 7 is a section similar to Fig. 5, somewhat enlarged, with the plunger or piston in normal position, and the co-acting fluid containers approaching fully closed position.

Fig. 8 is a perspective view of one of the ends of a trapping arm.

The trap comprises the usual base plate or support 8 which is formed of a narrow strip of metal having its ends bent upwardly, as at 9, each end being provided with two pivot openings into which the pivots 10 of the usual U-shaped or substantially U-shaped trapping jaws 11 are held.

Fastened centrally to the base plate or support 8 and extending laterally therefrom is an arm 12 having an upwardly curved portion 13 between its ends in which is pivotally secured the outer end of an arm 14 extending from the circular step plate 15, the arm 14 having a retainer hook 16 thereon adapted to engage a dog or detent 17 pivoted to the outer end of said arm 12, said dog being adapted to lie over one of the trapping jaws 11 when the trap is opened and to be retained by the hook 16 for keeping said jaws in opened position.

18 designates the usual spring which is formed of comparatively thin spring material bent medially upon itself, as at 19, and having openings 20 in its free ends, these openings being adapted to receive the upwardly bent ends 9 of the base plate or support 8. The two parts of the spring tend to separate, as shown by dotted lines in Fig. 2, but when the jaws are opened and retained in open position by the dog or detent 17, the spring is compressed so that immediately the hook 16 is disengaged from said dog or detent, the jaws will snap upwardly and inwardly with considerable force. In order that the trap may not be carried away by an animal trapped therein, a loop 21 is secured to the bent outer end of the spring to which a chain 22 or other suitable retaining device may be secured.

The trap thus far described is what may be termed a regulation steel trap, but as shown in the drawings, a slight difference exists over the regulation steel trap in that the pivots 10 of the trapping jaws are offset from the jaws and are made somewhat longer than the pivots of the regulation trap so that the extremities of the jaws proper are spaced from the upwardly bent ends 9 of the base plate or support 8. In order to offset the pivots, the ends of the U-shaped jaws 11 are bent or formed at right angles to the main or body portion of the jaws, as at 23, and these bent portions 23 are normally spaced from the inner sides of the upwardly bent ends 9 of the base plate or support 8.

24 designates our improved fluid container and injecting device, or what may be termed a puncturing element. In the drawings we have shown a pair of these devices and each is of substantially U-formation, having its intermediate portion 25 widened and made hollow to form a segmental chamber 26. The outer wall of each chamber has a threaded opening into which a plug 27 is threaded, the chamber being supplied with the injecting fluid through this opening, after removing the plug. The medial portion of said U-shaped element is bored out at regular intervals along the range of said segmental chamber, alternate bores serving as cylinders 28, and the bore therebetween providing receiving openings 29, for a purpose to appear hereinafter.

Each cylinder 28 is connected with the segmental chamber 26 in the same puncturing element by a passage 30, and the outer end of each cylinder is threaded to receive an ejector nozzle 31 having a reduced inner end 32 forming a shoulder 33 and a reduced outer end 34 whose extremity is preferably machined at an angle, as at 35, to form a pointed prong. Within each cylinder 28 is a hollow piston or plunger 36 having a trigger stem 37 extending outwardly through an axial opening in the closed inner end of said cylinder. Each piston or plunger is reduced in diameter along the greater portion of its length, as at 38, so as to form an outwardly facing shoulder 39 thereon, and surrounding the reduced portion of said piston or plunger is an expansion spring 40 which bears with one end against the shoulder 33 formed on said nozzle and with its other end against the shoulder 39 formed on said piston. This spring serves to normally retain the piston in its innermost position with the trigger stem 37 projecting from the fluid container or injecting device. The inner portion of the nozzle 31 fits into the open end of the piston or plunger 36 and has a small axial bore or passage 41. The piston is provided with ports 42 which connect the interior of the piston with the space surrounding the same and as the passage 30 connecting the piston with the segmental fluid chamber 26 provides fluid from said chamber to the space in said cylinder surrounding said piston, the fluid is fed into the hollow-piston through the ports 42.

When two fluid containers or injecting devices are employed, one in connection with each jaw of the trap, the cylinders 28 in one fluid container will be opposite the receiving pockets 29 in the other, so that when the jaws are closed and the fluid containers and ejecting devices forced upwardly and inwardly with the jaws and ahead of them, the nozzles 31 of one fluid container may enter the pockets of the other, as clearly shown in Fig. 7, thus guarding the points of the prongs so as to prevent scratching of the party handling the trap.

With the trap set as shown in Fig. 1, the jaws 11 will be retained in open position by the dog or detent 17 and the hook 16 on the arm of the step plate 15, said dog or detent lying over one of the jaws and keeping the spring compressed. At the same time, the fluid containers and ejecting devices also assume what may be termed an open position, in which they lie against the tops of the jaws. An animal stepping upon the plate 15 will cause disengagement of the hook 16 on the arm 14 of said plate from the dog or detent 17, whereupon the upper half of the spring 18 will snap upwardly from the position shown in full lines in Fig. 2, to that shown in dotted lines, thereby quickly and forcibly moving the jaws and the liquid containers and ejecting devices into closed position. This results in at least one of the pointed prongs being forced into the foot or leg of the animal and at the same time the forcible closing of the jaws will, by acting upon the trigger stems 37, move the plungers or pistons 36 outwardly, with the result that the poisonous fluid within the plungers or pistons will be ejected through the nozzle 31 and into the animal, the intention being to cause instant or almost instant death of the animal and prevent suffering.

While we have shown two fluid containers and injecting devices, which may be termed "fluid holding injecting devices," or "puncturing devices," in a still broader sense, it is quite apparent that a single device of this kind acting in conjunction with one of the jaws 11 may be used instead of two, in which case one of the jaws may be provided with openings into or through which the nozzles, prongs, or teeth, as they may be termed, may extend when the trap is closed; or any other arrangement may be used which will permit the closing of the trap while placing the fluid-holding injecting device into action.

It will also be apparent that each U-shaped puncturing device or element may have a single cylinder and piston, and that the cylinder and piston and the nozzle and stem associated therewith, or their equivalents, may be considered fluid injecting means associated with means carired by a jaw, or by the jaws of the trap and co-acting therewith.

Having thus described our invention, what we claim is:—

1. An animal trap, comprising a pair of spring-actuated jaws, and means carried by one of said jaws adapted to inject a fluid into the animal trapped by said jaws.

2. An animal trap, comprising a pair of spring-actuated jaws, and means carried and actuated by one of said jaws adapted to inject a fluid into the animal trapped by said jaws.

3. An animal trap, comprising a pair of spring-actuated jaws, co-acting means carried by said jaws and movable therewith, said co-acting means having a fluid-injecting device adapted to be actuated when closing said jaws.

4. An animal trap, comprising a pair of spring-actuated jaws, and co-acting means carried by a jaw and movable therewith, said co-acting means having a fluid injecting device adapted to be actuated by said jaws.

5. An animal trap, comprising a pair of pivoted jaws, means to retain said jaws in open position, means to forcibly close said jaws when said retaining means is released, puncturing elements carried by the pivots of said jaws and movable with said jaws, said puncturing elements including fluid injecting means associated therewith and adapted to be actuated when closing said jaws.

6. An animal trap, comprising a support, substantially U-shaped jaws having pivots at opposite ends offset to the main or body portion of the jaws, said pivots being entered in said support, substantially U-shaped puncturing elements pivotally secured to the pivots of said jaws and lying against said jaws when opened, a spring to forcibly close said jaws and said puncturing elements to travel ahead of said jaws, said puncturing elements including means to eject a fluid when the jaws approach their closing positions.

7. A steel trap having a pair of U-shaped jaws, a U-shaped element movable with each of said jaws and each having a fluid chamber, a cylinder in communication with said fluid chamber, a puncturing prong extending from said cylinder and having a passage therethrough, a piston within said cylinder movable in one direction by the closing movement of said jaws, and a spring to move said cylinder in its other direction and retain the same at the end of its movement in said other direction.

8. An animal trap, comprising a pair of substantially U-shaped pivoted jaws, a pair of substantially U-shaped puncturing elements carried by said jaws and adapted to close therewith, the medial portion of each puncturing element being made hollow to provide a fluid chamber and a series of cylinders in communication with said fluid chamber, a puncturing prong threaded into one end of each cylinder and having an axial bore therethrough, a piston in each cylinder having a trigger stem extending through the other end of said cylinder adapted to be engaged by the jaw carrying said puncturing element, said piston having a port through which fluid is passed from said cylinder to be ejected through the axial bore of said puncturing prong.

9. An animal trap, comprising a pair of pivoted substantially U-shaped jaws, a pair of substantially U-shaped puncturing elements pivotally connected to the pivots of said jaws, each puncturing element having its medial portion provided with a fluid chamber and having a series of bores arranged along said chamber, alternate bores serving as cylinders and the bores therebetween as receiving pockets, a passage connecting said fluid chamber with each of said cylinders, a puncturing prong for each cylinder having a passage opening into said cylinder, a piston within each cylinder having a reduced portion forming a shoulder and a port connecting the interior of the piston with said cylinder, a spring between said puncturing prong and the shoulder of said piston for retaining said piston at the end of its movement in one direction and keeping the interior of said piston in communication with the interior of said cylinder, and a trigger stem extending from said piston through said cylinder adapted to be engaged by the co-acting jaw for forcibly moving said piston in its opposite direction and thereby eject fluid from said piston through the passage of said puncturing prong.

10. An animal trap, comprising a pair of jaws having a charge of injecting fluid adapted to be injected into an animal upon the closing movement of said jaws.

In testimony whereof we affix our signatures.

JOHN B. MULHOLLAND.
ALFRED F. BORSCHEL.